United States Patent
Miyazaki et al.

[11] Patent Number: 5,270,391
[45] Date of Patent: Dec. 14, 1993

[54] COMPOSITION FOR THERMOSETTING POWDER COATING

[75] Inventors: Eiichiro Miyazaki, Fujisawa; Makoto Nishimori; Taisaku Kano, both of Yokohama; Takayoshi Sekido, Hiratsuka; Masashi Seki, Kamakura, all of Japan

[73] Assignee: Mitsui Toatsu Chemicals, Inc., Tokyo, Japan

[21] Appl. No.: 976,506

[22] Filed: Nov. 13, 1992

[30] Foreign Application Priority Data

Nov. 27, 1991 [JP] Japan .................................. 3-312025
Dec. 27, 1991 [JP] Japan .................................. 3-345872

[51] Int. Cl.$^5$ ..................... C09D 137/00; C08L 37/00
[52] U.S. Cl. ..................................... 525/194; 525/208; 428/413
[58] Field of Search ............................... 525/194, 208

[56] References Cited

U.S. PATENT DOCUMENTS 3,752,870 8/1973 Labana ............................. 525/208
4,988,767 1/1991 Pettit, Jr. ........................... 525/194

FOREIGN PATENT DOCUMENTS 52-77137 6/1977 Japan .
1312098 4/1973 United Kingdom .

Primary Examiner—David J. Buttner
Attorney, Agent, or Firm—Burns, Doane, Swecker & Mathis

[57] ABSTRACT

A composition for thermosetting powder coating, which comprises
(a) an acrylic copolymer of high softening point having an epoxy equivalent of 250–1,000 g/eq and a softening point of 90°–160° C.,
(b) an acrylic copolymer of low softening point having an epoxy equivalent of 200–600 g/eq and a softening point of 30°–70° C.,
(c) a polycarboxylic acid, and
(d) optionally, a phosphoric acid ester compound and/or a phosphorous acid ester compound, and wherein the difference in softening point between (a) and (b) is 60°–120° C., the weight ratio of (a)/(b) is 95/5 to 60/40, and the equivalent ratio of [the total epoxy groups of (a) and (b)] : [the acid group of (c)] is 0.5:1 to 1:0.5.

Said composition has excellent storage stability and, when used as a coating for automobiles, gives a film superior in appearance, solvent resistance and acid resistance.

12 Claims, No Drawings

COMPOSITION FOR THERMOSETTING POWDER COATING

FIELD OF THE INVENTION

The present invention relates to a composition for thermosetting powder coating having excellent low-temperature curability and excellent storage stability and capable of giving a coating film of good appearance (e.g. good smoothness and good sharpness) and good solvent resistance.

DESCRIPTION OF THE PRIOR ART

In recent years, powder coatings have been in wide use because they contain no solvent in order to avoid the evaporation of organic solvent during baking or the deterioration of the working environment, that they are non-hazardous substances and that they contribute to resource saving.

As such powder coatings, epoxy resin powder coatings composed mainly of bisphenol A and polyester resin powder coatings have heretofore been used practically. These powder coatings, however, have been insufficient for outdoor applications because they are inferior in weatherability and resistance to acid rain (the acid rain problem has become increasingly important in recent years).

In UK Patent No. 1312098, the present inventors proposed an acrylic resin powder coating. Since the powder coating contains a single copolymer (not a plurality of copolymers), there is used, as said copolymer, a copolymer of high softening point in order for the coating to have good storage stability (e.g. good anti-blocking property). Hence, a high temperature of 160° C. or more is necessary in the baking of the coating in order for the copolymer in the coating to be sufficiently melted. Thus, the coating has no low-temperature curability as intended by the present invention and is not suitable for the low-temperature curing at 140° C. currently employed for baking of solvent type acrylic-melamine coatings, and further exhibits insufficient fluidity during the baking and as a result gives a coating film of inferior smoothness and appearance.

In Japanese Patent Application Kokai (Laid-Open) No. 77137/1977, there was disclosed a resin composition for powder coating comprising 100 parts by weight of an acrylic polymer mixture and 3-55 parts by weight of a particular aliphatic dibasic acid, the acrylic copolymer mixture comprising (A) 30–70% by weight of a copolymer composed mainly of 15–50% by weight of glycidyl (meth)acrylate and 30–85% by weight of an alkyl (meth)acrylate and having a secondary transition temperature (hereinafter referred to as Tg) of 0°–60° C. and a number-average molecular weight of 1,000–5,000, and (B) 70–30% by weight of a copolymer composed mainly of 3–25% by weight of glycidyl (meth)acrylate, 30–87% by weight of an alkyl (meth)acrylate and 10–30% by weight of unsubstituted or nucleus-substituted styrene and having a Tg of 30°–100° C. and a number-average molecular weight of 10,000–70,000.

Recently, in U.S. Pat. No. 4988767, there was disclosed a composition for thermosetting powder coating comprising (a) 1–25% by weight, based on the solid resin weight, of an acid group-containing first polymer (e.g. acrylic polymer) having a Tg of −20° to 30° C., (b) 40–75% by weight, based on the solid resin weight, of an acid group-containing second polymer having a Tg of 40°–100° C., and (c) a curing agent (e.g. β-hydroxyalkylamide, polyepoxy) capable of reacting with the acid groups in (a) and (b) to form a crosslinked product.

Each of the above two documents discloses mixed use of copolymers differing in Tg. However, the former document makes no mention of mixed use of copolymers largely differing in Tg, and discloses merely a composition capable of giving a coating film excellent in adhesion and mechanical strength (e.g. DuPont impact strength). The latter document shows only the storage stability (this has a connection with the cohesion), Gardner impact data, etc. of the above-mentioned composition. Further, in the documents, no sufficient disclosure is made on the mixed use and there is provided no material having low-temperature curability as desired in the present invention, in particular, curability at, for example, 140° C. which is a baking temperature currently employed for solvent type acrylic-melamine type coatings. The composition in the former document requires a baking temperature as high as about 200° C., and the composition in the latter document needs a baking temperature of about 180° C. due to the difference in curing reaction mechanism between said composition and the present composition.

OBJECTS AND SUMMARY OF THE INVENTION

An object of the present invention is to provide a coating for thermosetting powder coating, which is superior in low-temperature curability, in particular, low-temperature curability as evaluated by the flow property during low-temperature baking after high-temperature storage, and which can give a coating film having mechanical properties as exhibited by the above-mentioned prior art and other excellent film properties in smoothness, gloss, etc.

Another object of the present invention is to provide a composition for thermosetting powder coating, capable of giving a coating film with improved solvent resistance.

The above objects of the present invention can be achieved by providing a composition for thermosetting powder coating, which comprises (a) an acrylic copolymer of high softening point comprising an epoxy group-containing monomer and other monomer copolymerizable therewith and having an epoxy equivalent of 250–1,000 g/eq, a softening point of 90°–160° C. and a number-average molecular weight of 2,500 to less than 10,000, (b) an acrylic copolymer of low softening point comprising an epoxy group-containing monomer and other monomer copolymerizable therewith and having an epoxy equivalent of 200–600 g/eq, a softening point of 30°–70° C. and a number-average molecular weight of 500–2,000, and (c) a polycarboxylic acid, and wherein the difference in softening point between the acrylic copolymer (a) of high softening point and the acrylic copolymer (b) of low softening point is 60°–120° C., the weight ratio of (a)/(b) is 95/5 to 60/40, and the equivalent ratio of [the total epoxy groups of (a) and (b)] : [the acid group of (c)] is 0.5:1 to 1:0.5.

The composition of the present invention is characterized in that the difference in softening point between the acrylic copolymer (a) of high softening point and the acrylic copolymer (b) of low softening point be specified in the range of 60°–120° C. The objects of the present invention can be achieved at a higher level by narrowing the above range.

The objects of the present invention can be achieved at a higher level by allowing the above composition to further comprise (d) a phosphoric acid ester compound and/or a phosphorous acid ester compound in an amount of 0.01–1 part by weight per 100 parts by weight of the total of the acrylic copolymer (a) of high softening point and the acrylic copolymer (b) of low softening point.

The composition for thermosetting powder coating according to the present invention is superior in low-temperature curability and storage stability and, when made into a coating film by two-coat one-bake method, is superior in appearance when viewed visually and solvent resistance.

DESCRIPTION OF THE PREFERRED EMBODIMENTS

In the present invention, the epoxy group-containing monomer used in the acrylic copolymer (a) of high softening point includes, for example, glydicyl methacrylate, glycidyl acrylate, methylglycidyl methacrylate, methylglycidyl acrylate and acrylic glycidyl ether. They can be used singly or in combination of two or more.

The other monomer copolymerizable with the epoxy group-containing monomer includes (meth)acrylic acid esters such as methyl (meth)acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, stearyl (meth)acrylate, tridecyl (meth)acrylate, cyclohexyl (meth)acrylate, benzyl (meth)acrylate, phenyl (meth)acrylate, hydroxyethyl (meth)acrylate, hydroxypropyl (meth)acrylate, hydroxybutyl (meth)acrylate and 1,4-butanediol mono(meth)acrylate; (meth)acrylic acid; maleic acid, maleic anhydride, itaconic acid and their monoesters; and dimethylaminoethyl (meth)acrylate and diethylaminoethyl (meth)acrylate.

In the above compounds, methyl (meth)acrylate, for example, refers to methyl acrylate and/or methyl methacrylate.

The other monomer copolymerizable with the epoxy group-containing monomer also includes, for example, styrene, α-methylstyrene, vinyltoluene, acrylonitrile, methacrylonitrile, vinyl acetate, vinyl propionate, acrylamide, methacrylamide, methylolacrylamide, methylolmethacrylamide, vinyl chloride, ethylene, propylene and $C_{4-20}$ α-olefins.

Appropriately, the epoxy group-containing monomer is used in such an amount that the resulting acrylic copolymer (a) of high softening point has an epoxy equivalent of 250–1,000 g/eq. The epoxy equivalent is preferably in the range of 300–500 g/eq. When the epoxy equivalent is larger than 1,000 g/eq, the resulting composition has no sufficient low-temperature curability during baking and the coating film obtained has inferior solvent resistance. When the epoxy equivalent is less than 250 g/eq, the resulting composition gives a coating film having a rough surface and undesirable appearance.

Incidentally, the epoxy equivalent is expressed by the weight (g) of resin per equivalent of epoxy group, and the unit is g/eq.

In the present invention, the acrylic copolymer (a) of high softening point contributes to improvement in the storage stability of the resulting composition for thermosetting powder coating, and the acrylic copolymer (b) of low softening point contributes to improvement in the low-temperature curability and fluidity of the composition.

In order to allow the present composition for thermosetting powder coating to have good low-temperature curability and storage stability and give a coating film of good appearance and solvent resistance (conventional powder coatings are inferior in at least any of these properties), it is necessary to control the particular properties of the acrylic copolymer (a) of high softening point and the acrylic copolymer (b) of low softening point each in a specific range and further, as described later, control the amount relationship and differences in particular properties, of the copolymers (a) and (b) each in a specific range.

The softening point of the acrylic copolymer (a) of high softening point is appropriately in the range of 90°–160° C. When the softening point is lower than 90° C., the resulting composition has inferior storage stability and is not suitable for practical application. When the softening point is higher than 160° C., the composition has low fluidity during the baking and gives a coating film of inferior smoothness and appearance.

Incidentally, the softening point of the acrylic copolymer can be obtained by a ring and ball softening point method (JIS K 2531).

The Tg of the acrylic copolymer (a) of high softening point is appropriately 70°–120° C. When the Tg is lower than 70° C., the resulting composition has inferior storage stability and is not suitable for practical application. When the Tg is higher than 120° C., the composition has low fluidity during baking and the resulting coating film has inferior smoothness and appearance.

Incidentally, the Tg of the acrylic copolymer can be obtained using the formula of Fox.

The number-average molecular weight of the acrylic copolymer (a) of high softening point is appropriately 2,500–10,000, more appropriately 2,800–9,600. When the number-average molecular weight is less than 2,500, the resulting composition has inferior storage stability and is not suitable for practical application. When the molecular weight is more than 10,000, the composition has low fluidity during baking and the resulting coating film has inferior smoothness and appearance.

Incidentally, the number-average molecular weight of the acrylic copolymer was measured by GPC using polystyrene as a standard.

The acrylic copolymer (a) of high softening point can be produced by an ordinary process, i.e. any of known polymerization processes such as solution polymerization, suspension polymerization, bulk polymerization, emulsion polymerization and the like.

In the present invention, as the epoxy group-containing monomer used in the acrylic copolymer (b) of low softening point, there can be mentioned the same monomers as mentioned with respect to the acrylic copolymer (a) of high softening point. These monomers can be used singly or in combination of two or more.

Also, as the other monomer copolymerizable with the epoxy group-containing monomer, there can be mentioned the same other monomers as mentioned with respect to the acrylic copolymer (a) of high softening point.

Appropriately, the epoxy group-containing monomer is used in such an amount that the resulting acrylic copolymer (b) of low softening point has an epoxy equivalent of 200–600 g/eq. The epoxy equivalent is preferably in the range of 250–450 g/eq. When the epoxy equivalent is larger than 600 g/eq, the resulting composition has no sufficient low-temperature curability during baking and the coating film obtained has inferior solvent resistance. When the epoxy equivalent is smaller than 200 g/eq, the resulting composition gives a coating film having a rough surface and undesirable appearance.

The softening point of the acrylic copolymer (b) of low softening point is appropriately 30°–70° C. When the softening point is lower than 30° C., the resulting composition has inferior storage stability and is not suitable for practical application. When the softening point is higher than 70° C., the composition has low fluidity during baking and the coating film obtained has inferior smoothness and appearance.

The Tg of the acrylic copolymer (b) of low softening point is appropriately in the range of $-30°$ to 40° C. The Tg is more appropriately in the range of $-20°$ to 20° C. When the Tg is lower than $-30°$ C., the resulting composition has inferior storage stability and is not suitable for practical application. When the Tg is higher than 40° C., the composition has low fluidity during baking and the coating film obtained has inferior smoothness and appearance.

The number-average molecular weight of the acrylic copolymer (b) of low softening point is appropriately 500–2,000, more appropriately 800–2,000. When the number-average molecular weight is less than 500, the resulting composition has inferior storage stability and weatherability and is not suitable for practical application. When the molecular weight is more than 2,000, the composition has low fluidity during baking and the coating film obtained has inferior smoothness and appearance. The number-average molecular weight is most appropriately 1,000–2,000.

The difference in softening point between the acrylic copolymer (a) of high softening point and the acrylic copolymer (b) of low softening point is in the range of 60°–120° C., preferably 64°–110° C. When the difference in softening point is smaller than 60° C., the resulting composition gives rise to blocking after its preparation and has inferior storage stability when both of the acrylic copolymers (a) and (b) have relatively low softening points and, when they have relatively high softening points, the composition has inferior fluidity during baking similar to conventional acrylic resin powder coatings and gives a coating film of inferior appearance. When the difference in softening point is larger than 120° C., only the copolymer (b) is melted and then cured, and the curing reaction of the composition is over in a state that the copolymer (a) is not sufficiently melted and cured; therefore, the coating film obtained has inferior appearance.

The above difference in softening point may be put in another expression that the difference in Tg between the acrylic copolymer (a) of high softening point and the acrylic copolymer (b) of low softening point is 70°–125° C. In such an expression, the Tg of the acrylic copolymer (a) of high softening point is generally in the range of 70°–120° C., and the Tg of the acrylic copolymer (b) of low softening point is generally in the range of $-30°$ to 40° C.

The acrylic copolymer (b) of low softening point can be synthesized by an ordinary process, similar to the acrylic copolymer (a) of high softening point.

The weight ratio of the acrylic copolymer (a) of high softening point and the acrylic copolymer (b) of low softening point, i.e. the weight ratio of (a)/(b) is appropriately 95/5 to 60/40. When the weight ratio is larger than 95/5 [the proportion of (a) is larger than 95], the resulting composition gives a coating film of inferior appearance, similar to conventional acrylic resin powder coatings. When the weight ratio is smaller than 60/40 [the proportion of (b) is larger than 40], the composition gives a soft coating film having insufficient hardness, in which abrasion, etc. are easily formed and which is not suitable for practical application.

The polycarboxylic acid (c) used in the present composition is a curing agent component for reacting with the epoxy groups contained in the acrylic copolymer (a) of high softening point and the acrylic copolymer (b) of low softening point.

The polycarboxylic acid is exemplified by aliphatic dibasic acids such as adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, eicosanedioic acid, docosanedioic acid and tetracosanedioic acid; aromatic polycarboxylic acids such as isophthalic acid and trimellitic acid; and alicyclic dibasic acids such as hexahydrophthalic acid and tetrahydrophthalic acid. Besides the above dibasic acids, there can also be used polyester resins having carboxyl groups.

Appropriately, the polycarboxylic acid (c) is used in such an amount that the equivalent ratio of [the total epoxy groups of the acrylic copolymer (a) of high softening point and the acrylic copolymer (b) of low softening point] : [the acid group of the polycarboxylic acid (c)] becomes 0.5:1 to 1:0.5. When the equivalent ratio is outside the above range, the resulting composition gives a coating film of inferior solvent resistance.

In the present composition, the phosphoric acid ester compound and phosphorous acid ester compound (d) is used as a catalyst for the curing reaction between the epoxy groups of (a) and (b) and the acid group of (c).

The phosphoric acid ester compound includes trimethyl phosphate, triethyl phosphate, tri-n-butyl phosphate, tris(butoxyethyl) phosphate, tris(2-ethylhexyl) phosphate, $(RO)_3P=O$ (R=lauryl, cetyl, stearyl or oleyl), tris(2-chloroethyl) phosphate, tris(2-dichloropropyl) phosphate, triphenyl phosphate, butyl pyrophosphate, tricresyl phosphate, trixylenyl phosphate, octyl diphenyl phosphate, cresyl diphenyl phosphate, xylenyl diphosphate, monobutyl phosphate, dibutyl phosphate, di-2-ethylhexyl phosphate, monoisodecyl phosphate, ammonium ethyl acid phosphate, 2-ethylhexyl acid phosphate, etc.

The phosphorous acid ester compound includes trimethyl phosphite, triethyl phosphite, tri-n-butyl phosphite, tris(2-ethylhexyl) phosphite, triisooctyl phosphite, tridecyl phosphite, triisodecyl phosphite, tris(tridecyl) phosphite, trioleyl phosphite, tristearyl phosphite, triphenyl phosphite, tris(nonylphenyl) phosphite, tris(2,4-di-tert-butylphenyl) phosphite, phenyl diisooctyl phosphite, phenyl diisodecyl phosphite, diphenyl mono(2-ethylhexyl) phosphite, diphenyl isooctyl phosphite, diphenyl monodecyl phosphite, diphenyl monoisodecyl phosphite, diphenyl mono(tridecyl) phosphite, bis(nonylphenyl) dinonylphenyl phosphite, tetraphenyl dipropylene glycol diphosphite, poly(dipropylene glycol) phenyl phosphite, diisodecyl pentaerythritol diphosphite, bis(tridecyl) pentaerythritol diphosphite, distearyl pentaerythritol diphosphite, bis(nonylphenyl) pentaerythritol diphosphite, tetraphenyl tetra(tridecyl) pentaerythritol tetraphosphite, tetra(tridecyl)-4,4'-isopropylidene diphenyl phosphite, trilauryl trithiophosphite, dimethyl hydrogenphosphite, dibutyl hydrogenphosphite, di(2-ethylhexyl) hydrogenphosphite, dilauryl hydrogenphosphite, dioleyl hydrogenphosphite, diphenyl hydrogenphosphite, etc.

For each of the phosphoric acid ester compound and the phosphorous acid ester compound, at least one of the specific compounds shown above can be used. The phosphoric acid ester compound and the phosphorous acid ester compound can be used in combination.

The amount of the phosphoric acid ester compound and phosphorous acid ester compound (d) used is appropriately 0.01-1 part by weight per 100 parts by weight of the total of the acrylic copolymer (a) of high softening point and the acrylic copolymer (b) of low softening point. When the amount is less than 0.01 part by weight, the resulting composition has inferior curability during baking at 120° C. and is unable to exhibit sufficient low-temperature curing. When the amount is more than 1 part by weight, the composition has inferior storage stability.

The present composition for thermosetting powder coating may further comprise various resins such as synthetic resins (e.g. epoxy resin, polyester resin, polyamide resin) and cellulose derivatives to such an extent that the objects of the present invention are not impaired. The composition may furthermore comprise additives ordinarily used in coatings, such as pigment, flow-controlling agent, anti-blocking agent, ultraviolet absorber, benzoin, antistatic agent and antioxidant.

When used as a clear coating, the present composition may be colored with a small amount of a pigment in such an extent that the clearness of the present composition is not completely opacified with the pigment.

In order to produce the present composition for thermosetting powder coating, any of known methods may be used. Ordinarily, the acrylic copolymer (a) of high softening point and the acrylic copolymer (b) of low softening point are compounded in desired proportions; further, the polycarboxylic acid (c) and, optionally, the phosphoric acid ester compound and/or phosphorous acid ester compound (d) are compounded so as to give the respective desired proportions.

The compounding of the phosphoric acid ester compound and/or phosphorous acid ester compound (d) is preferably conducted by adding the desired amount of said compound(s) to the solution of the acrylic copolymer (a) of high softening point and/or the acrylic copolymer (b) of low softening point and then removing the solvent contained in the solution.

The thus obtained compound is subjected to thorough melt mixing using a melt kneader such as heating roll, extruder or the like, then cooled and ground to obtain a powder coating composition.

In coating the composition, it is coated on a material to be coated, by electrostatic coating, fluidized dip coating or the like; the baking is conducted in a baking furnace of 100°-150° C. (generally about 140° C.) to obtain a coating film.

The composition for thermosetting powder coating according to the present invention can be used as a top coating for automobiles. In that case, the composition is applicable to the two-coat one-bake system employed currently.

The present invention is hereinafter described in more detail with reference to Examples and Comparative Examples. However, the present invention is in no way restricted to these Examples. In the followings, parts and % are by weight unless otherwise specified.

REFERENCE EXAMPLE 1

Production of acrylic copolymers (a-1) to (a-9)

66.7 parts of xylene was fed into a four-necked flask equipped with a stirrer, a thermometer, a reflux condenser and a nitrogen inlet tube. The flask contents were heated to its reflux temperature. Thereto were dropwise added the monomers shown in Table 1 and N,N'-azobisisobutyronitrile (polymerization initiator) in the amounts shown in Table 1, in 5 hours. The resulting mixture was kept at 100° C. for 5 hours. The solvent was removed from the reaction mixture to obtain high-softening point acrylic copolymers (a-1) to (a-9).

Production of acrylic copolymers (b-1) to (b-9)

Low-softening point acrylic copolymers (b-1) to (b-9) having respective monomer compositions shown in Table 2 were obtained in the same manner as above.

REFERENCE EXAMPLE 2

Preparation of base coatings 2-1 Preparation of metallic base coating

Into the same flask as used in Reference Example 1 were fed 80 parts of xylol and 20 parts of n-butanol. The mixture was heated to 100° C. Thereto were dropwise added raw materials consisting of 10 parts of styrene, 10 parts of methyl methacrylate, 30 parts of butyl acrylate, 35 parts of isobutyl acrylate, 12 parts of 2-hydroxyethyl methacrylate, 3 parts of methacrylic acid and 2 parts of N,N'-azobisisobutyronitrile, in 5 hours. The resulting mixture was kept at the same temperature for 5 hours to obtain an acrylic resin.

180 parts of the above acrylic resin, 37.5 parts of UVAN 20SE-60 (trade name) (a butyrated melamine resin having a solid content of 60% manufactured by Mitsui Toatsu Chemicals, Inc.) and 16.8 parts of Alpaste 7160N (trade name) (an aluminum flake paste manufactured by TOYO ALUMINUM K.K.) were mixed using a stirrer, to obtain a metallic base coating.

2—2 Preparation of solid color coating

A solid color coating was prepared as follows.

Acrylic copolymer (a-2) produced in Reference Example 1: 562 parts

Acrylic copolymer (b-2) produced in Reference Example 1: 188 parts

Dodecanedioic acid: 250 parts

Titanium oxide CR-930 (trade name) (a product of ISHIHARA SANGYO KAISHA, LTD.): 250 parts The above materials were melt kneaded at 90° C. using a hot roll, then cooled and finely ground using a grinder. The resulting powder was filtered through a 150-mesh sieve. The portion which had passed through the sieve, was collected to obtain a solid color coating.

REFERENCE EXAMPLE 3

Preparation of clear coatings

Clear coatings were prepared from the materials shown in Table 3, of the proportions shown in Table 3, in the same manner as in 2—2 (Preparation of solid color coating) of Reference Example 2.

EXAMPLE 1

A clear coating was prepared from the acrylic copolymer (a-1), the acrylic copolymer (b-3) and dodecanedioic acid of the amounts shown in Table 3, in the same manner as in Reference Example 3.

A cationic electrocoating was coated on a steel plate for automobile body and baked. Thereon was coated, by air spraying, the metallic base coating prepared in (2-1) of Reference Example 2, followed by setting for 3 minutes. Thereon was coated the above prepared clear coating by electrostatic spraying so as to give a film thickness of 60-70 $\mu$, followed by setting for 10 minutes. The resulting plate was baked at 140° C. for 30 minutes to obtain a test plate.

The properties of the coating film of the test plate were measured and the results are shown in Table 4.

EXAMPLES 2-5 AND COMPARATIVE EXAMPLES 1-10

Coatings were prepared from the materials shown in Table 3, of the amounts shown in Table 3, in the same manner as in Example 1. Using the coatings, test plates were obtained in the same manner as in Example 1.

The properties of the coating film of each test plate were measured and the results are shown in Table 4.

EXAMPLE 6

On the same steel plate (coated with a cationic electrocoating) as used in Example 1 was coated the solid color coating prepared in (2—2) of Reference Example 2, by electrostatic coating. Thereon was coated the same clear coating as used in Example 1, followed by baking at the same temperature to obtain a test plate.

The properties of the coating film of the test plate were measured and the results are shown in Table 4.

COMPARATIVE EXAMPLE 11

Into the same flask as used in Reference Example 1 was fed 66.7 parts of xylene. The xylene was heated to its reflux temperature. Thereto were dropwise added, in 5 hours, raw materials consisting of 15 parts of styrene, 62.5 parts of methyl methacrylate, 12 parts of butyl acrylate, 10.5 parts of acrylic acid and 5 parts of N,N'-azobisisobutyronitrile. The mixture was kept at 100° C. for 5 hours. The solvent was removed from the reaction mixture to obtain a carboxyl group-containing acrylic copolymer of high softening point.

The copolymer had an acid value of 76 mgKOH/g, a number-average molecular weight of 4,000, a softening point of 93° C. and a Tg of 70° C.

Into a flask of same shape and size was fed 66.7 parts of xylene. The xylene was heated to its reflux temperature. Thereto were dropwise added, in 5 hours, raw materials consisting of 15 parts of styrene, 37 parts of methyl methacrylate, 37.5 parts of butyl acrylate, 10.5 parts of acrylic acid and 5 parts of N,N'-azobisisobutyronitrile. The mixture was kept at 100° C. for 5 hours. The solvent was removed from the reaction mixture to obtain a carboxyl group-containing acrylic copolymer of low softening point.

The copolymer had an acid value of 76 mgKOH/g, a number-average molecular weight of 4,100, a softening point of 58° C. and a Tg of 25° C.

Into a flask of same shape and size were fed 118 parts of 1,6-hexanediol, 460 parts of dodecanedioic acid, 0.58 part of dibutyltin oxide and 145 parts of xylene. The mixture was heated to its reflux temperature. Then, the temperature was gradually increased to remove water and allow an esterification reaction to proceed. When an acid value of 165 was obtained, the solvent was removed to obtain a carboxyl group-containing polyester resin.

The resin had an acid value of 208 mgKOH/g and a number-average molecular weight of 980.

Into a flask of same shape and size were fed 934.2 parts of dimethyl adipate, 103.8 parts of dimethyl glutarate, 1,512 parts of diethanolamine and 4.7 parts of sodium methoxide. The mixture was heated to about 100° C. The temperature was gradually increased to distil off methanol and allow a reaction to proceed. Additional 1.2 parts of sodium methoxide was added and the mixture temperature was increased. When the amount of methanol distilled became 335 parts, the solvent was removed. After cooling, 2,000 ml of acetone was added, whereby hydroxyalkylamide was precipitated. After filtration and washing, an intended product (hydroxyalkylamide) was obtained.

The thus obtained carboxyl group-containing acrylic copolymer of high softening point (51 parts), carboxyl group-containing acrylic copolymer of low softening point (20 parts), polyester resin (12.7 parts) and hydroxyalkylamide (16 parts) were compounded and made into a coating in the same manner as in Reference Example 3. On the same steel plate (coated with a cationic electrocoating) as used in Example 1 was coated the above coating by electrostatic coating, followed by baking at the same temperature to obtain a test plate.

The properties of the coating film of the test plate were measured and the results are shown in Table 4.

1) Appearance

When a film had excellent appearance, particularly excellent smoothness, the appearance was rated as ⊚. When a film had slight unevenness, the appearance was rated as ◯. When a film had poor smoothness, the appearance was rated as X.

2) Gloss

Was expressed by a value (60° gloss value) obtained by measurement using a gloss meter.

3) Solvent resistance

A film was rubbed with a xylol-impregnated gauze 50 times forward and backward and then observed. When the surface gave no trace, the solvent resistance of the film was rated as ⊚. When the surface gave slight trace(s), the solvent resistance of the film was rated as ◯. When the surface gave distinct trace(s), the solvent resistance of the film was rated as X.

4) Storage stability

A powder coating was stored at 40° C. for 3 days and then made into pellets each of 10 mm in diameter and 0.3 g in weight. The pellets were adhered onto a plate. Then, the pellets-adhered plate was kept in a vertical condition and baking was conducted at 140° C. for 30 minutes to measure the condition of sagging of molten pellets to evaluate the flow property of the coating. When the flow property was good, the storage stability of the coating was rated as ⊚. When the flow property was inferior, the storage stability of the coating was rated as X.

5) Acid resistance

Sulfuric acid of 10 volume % in concentration was dropped on the surface of a coating film. The film was then allowed to stand at room temperature for 1 day, after which the sulfuric acid was wiped off and the film surface was observed. Traces of damage by sulfuric acid were seen in Comparative Example 11, but no damage was seen in all Examples and other Comparative Examples.

The properties of each polymer were measured by the following methods.

1) Softening point
Was measured by a ring and ball method (JIS K 2531).

2) Glass transition temperature
Was determined using the monomer composition of polymer and the formula of FOX.

3) Number-average molecular weight
Was measured by GPC using polystyrene as a standard.

TABLE 1

| Monomer composition | Acrylic copolymer No. | | | | | | | | |
|---|---|---|---|---|---|---|---|---|---|
| | (a-1) | (a-2) | (a-3) | (a-4) | (a-5) | (a-6) | (a-7) | (a-8) | (a-9) |
| St | 15 | 10 | 15 | | 24 | 10 | 10 | 15 | 15 |
| MMA | 17 | 5 | | 44 | 24 | 7 | | 58 | |
| n-BMA | | | | | | 13 | | | |
| i-BMA | | 10 | 6 | | | 20 | | | |
| IB-X | 38 | 35 | 32 | 36 | | | 65 | 17 | 20 |
| GMA | 30 | 40 | 47 | 20 | 52 | 50 | 25 | 10 | 65 |
| AIBN | 1.0 | 1.5 | 2.0 | 0.6 | 2.3 | 3.0 | 0.4 | 1.5 | 1.8 |
| Epoxy equivalent (g/eq) | 473 | 355 | 302 | 710 | 273 | 284 | 568 | 1420 | 218 |
| Softening point (°C.) | 148 | 127 | 115 | 157 | 95 | 80 | 170 | 148 | 98 |
| Glass transition temperature (°C.) | 108 | 95 | 90 | 115 | 72 | 55 | 130 | 110 | 75 |
| Number-average molecular weight (Mn) | 6000 | 5000 | 3500 | 9600 | 2800 | 2000 | 12000 | 5000 | 4000 |

Remarks
St: styrene
MMA: methyl methacrylate
n-BMA: n-butyl methacrylate
i-BMA: i-butyl methacrylate
IB-X: isobornyl methacrylate
GMA: glycidyl methacrylate
AIBN: N,N'-azobisisobutyronitrile

TABLE 2

| Monomer composition | Acrylic copolymer No. | | | | | | | | |
|---|---|---|---|---|---|---|---|---|---|
| | (b-1) | (b-2) | (b-3) | (b-4) | (b-5) | (b-6) | (b-7) | (b-8) | (b-9) |
| St | 10 | 15 | | 10 | 10 | 5 | 15 | 10 | 11 |
| MMA | | 10 | | | | | 10 | | |
| n-BA | | | 20 | | 47 | 7 | | | |
| i-BMA | 45 | | | | | 18 | | | |
| 2-EHA | | | 32 | 25 | 16 | | 65 | 48 | 9 |
| n-BMA | | | 8 | | | | 15 | 32 | |
| GMA | 35 | 45 | 55 | 27 | 65 | 30 | 60 | 10 | 80 |
| AIBN | 3.1 | 3.5 | 3.8 | 3.2 | 4.0 | 3.5 | 2.2 | 3.3 | 3.7 |
| Epoxy equivalent (g/eq) | 406 | 316 | 258 | 526 | 218 | 473 | 237 | 1420 | 178 |
| Softening point (°C.) | 50 | 44 | 38 | 31 | 63 | 23 | 92 | 33 | 68 |
| Glass transition temperature (°C.) | 18 | 0 | −15 | −27 | 31 | −39 | 55 | −25 | 36 |
| Number-average molecular weight (Mn) | 1800 | 1500 | 1200 | 1700 | 800 | 1500 | 3000 | 1600 | 1300 |

Remarks
n-BA: n-butyl acrylate
2-EHA: 2-ethylhexyl acrylate

TABLE 3

| | Acrylic resin (a) (parts) | Acrylic resin (b) (parts) | Weight ratio of (a)/(b) | Dodecanedioic acid (parts) | Equivalent ratio of epoxy/acid | Difference in softening point (°) |
|---|---|---|---|---|---|---|
| Example 1 | (a-1) 633 | (b-3) 112 | 85/15 | 255 | 0.8/1 | 110 |
| Example 2 | (a-2) 562 | (b-2) 188 | 75/25 | 250 | 1/1 | 83 |
| Example 3 | (a-3) 509 | (b-1) 274 | 65/35 | 217 | 1/0.8 | 65 |
| Example 4 | (a-4) 751 | (b-5) 83 | 90/10 | 166 | 1/1 | 94 |
| Example 5 | (a-5) 547 | (b-4) 183 | 75/25 | 270 | 1/1 | 64 |
| Example 6 | (a-1) 633 | (b-3) 112 | 85/15 | 255 | 0.8/1 | 110 |
| Comparative Example 1 | (a-6) 613 | (b-1) 108 | 85/15 | 279 | 1/1 | 30 |
| Comparative Example 2 | (a-7) 594 | (b-3) 198 | 75/25 | 208 | 1/1 | 132 |
| Comparative Example 3 | (a-8) 757 | (b-2) 133 | 85/15 | 110 | 1/1 | 104 |
| Comparative Example 4 | (a-9) 434 | (b-3) 234 | 65/35 | 332 | 1/1 | 60 |
| Comparative Example 5 | (a-2) 502 | (b-6) 270 | 65/35 | 228 | 1/1 | 104 |
| Comparative Example 6 | (a-1) 562 | (b-7) 188 | 75/25 | 250 | 1/1 | 56 |
| Comparative | (a-2) | (b-8) | 75/25 | 208 | 1/1 | 94 |

TABLE 3-continued

| | Acrylic resin (a) (parts) | Acrylic resin (b) (parts) | Weight ratio of (a)/(b) | Dodecanedioic acid (parts) | Equivalent ratio of epoxy/acid | Difference in softening point (°) |
|---|---|---|---|---|---|---|
| Example 7 | 594 | 198 | | | | |
| Comparative Example 8 | (a-3) 598 | (b-9) 106 | 85/15 | 296 | 1/1 | 47 |
| Comparative Example 9 | (a-2) 755 | | 100/0 | 245 | 1/1 | |
| Comparative Example 10 | (a-1) 372 | (b-3) 372 | 50/50 | 256 | 1/1 | 110 |

TABLE 4

| | Appearance (visual) | Gloss (60°) | Solvent resistance | Storage stability |
|---|---|---|---|---|
| Example 1 | ⊚ | 98 | ⊚ | ⊚ |
| Example 2 | ⊚ | 100 | ⊚ | ⊚ |
| Example 3 | ⊚ | 99 | ⊚ | ⊚ |
| Example 4 | ○ | 95 | ○ | ⊚ |
| Example 5 | ○ | 95 | ○ | ⊚ |
| Example 6 | ⊚ | 99 | ⊚ | ⊚ |
| Comparative Example 1 | ⊚ | 98 | ⊚ | X |
| Comparative Example 2 | X | 90 | ⊚ | ⊚ |
| Comparative Example 3 | ⊚ | 98 | X | ⊚ |
| Comparative Example 4 | X | 90 | ⊚ | ⊚ |
| Comparative Example 5 | ⊚ | 98 | ⊚ | X |
| Comparative Example 6 | X | 91 | ⊚ | ⊚ |
| Comparative Example 7 | ⊚ | 98 | X | ⊚ |
| Comparative Example 8 | X | 89 | ⊚ | ⊚ |
| Comparative Example 9 | X | 92 | ⊚ | ⊚ |
| Comparative Example 10 | ⊚ | 99 | ⊚ | X |
| Comparative Example 11 | ○ | 93 | X | ⊚ |

REFERENCE EXAMPLE 4

Production of acrylic copolymers (a-10) to (a-19)

66.7 parts of xylene was fed into a four-necked flask equipped with a stirrer, a thermometer, a reflux condenser and a nitrogen inlet tube. The flask contents were heated to its reflux temperature. Thereto were dropwise added the monomers shown in Table 5 and N,N'-azobisisobutyronitrile (polymerization initiator) in the amounts shown in Table 5, in 5 hours. The resulting mixture was kept at 100° C. for 5 hours. To the reaction mixture were/was added the phosphoric acid ester compound and/or phosphorous acid ester compound shown in Table 5, in the amount(s) shown in Table 5. Then, the solvent was removed from the mixture to obtain high-softening point acrylic copolymers (a-10) to (a-19).

Production of acrylic copolymers (b-10) to (b-20)

Low-softening point acrylic copolymers (b-10) to (b-20) having respective monomer compositions shown in Table 6 were obtained in the same manner as above.

REFERENCE EXAMPLE 5

Preparation of solid color coating

A solid color coating was prepared as follows.
Acrylic copolymer (a-11) produced in Reference Example 4: 563 parts
Acrylic copolymer (b-11) produced in Reference Example 4: 188 parts
Dodecanedioic acid: 249 parts
Titanium oxide CR-930 (trade name) (a product of ISHIHARA SANGYO KAISHA, LTD.): 250 parts The above materials were melt kneaded at 90° C. using a hot roll, then cooled and finely ground using a grinder. The resulting powder was filtered through a 150-mesh sieve. The portion which had passed through the sieve, was collected to obtain a solid color coating.

EXAMPLE 7

A clear coating was prepared from the acrylic copolymer (a-10), the acrylic copolymer (b-12) and dodecanedioic acid of the amounts shown in Table 7, in the same manner as in Reference Example 3.

A cationic electrocoating was coated on a steel plate for automobile body and baked. Thereon was coated, by air spraying, the metallic base coating prepared in (2-1) of Reference Example 2, followed by setting for 3 minutes. Thereon was coated the above prepared clear coating by electrostatic spraying so as to give a film thickness of 60–70 μ, followed by setting for 10 minutes. The resulting plate was baked at 120° C. for 30 minutes to obtain a test plate.

The properties of the coating film of the test plate were measured and the results are shown in Table 8.

EXAMPLES 8–11 AND COMPARATIVE EXAMPLES 12–23

Coatings were prepared from the materials shown in Table 7, of the amounts shown in Table 7, in the same manner as in Example 1. Using the coatings, test plates were obtained in the same manner as in Example 1.

The properties of the coating film of each test plate were measured and the results are shown in Table 8.

EXAMPLE 12

On the same steel plate (coated with a cationic electrocoating) as used in Example 1 was coated the solid color coating prepared in Reference Example 5, by electrostatic coating. Thereon was coated the same clear coating as in Example 7, followed by baking at the same temperature to obtain a test plate.

The properties of the coating film of the test plate were measured and the results are shown in Table 8.

TABLE 5

| Composition | Acrylic copolymer No. | | | | | | | | | |
|---|---|---|---|---|---|---|---|---|---|---|
| | (a-10) | (a-11) | (a-12) | (a-13) | (a-14) | (a-15) | (a-16) | (a-17) | (a-18) | (a-19) |
| St | 15 | 10 | 15 | | 24 | 10 | 10 | 15 | 15 | 15 |

TABLE 5-continued

| Composition | Acrylic copolymer No. | | | | | | | | | |
|---|---|---|---|---|---|---|---|---|---|---|
| | (a-10) | (a-11) | (a-12) | (a-13) | (a-14) | (a-15) | (a-16) | (a-17) | (a-18) | (a-19) |
| MMA | 17 | 5 | | 44 | 24 | 7 | | 58 | | 17 |
| n-BMA | | | | | | | 13 | | | |
| i-BMA | | | 10 | 6 | | | 20 | | | |
| IB-X | 38 | 35 | 32 | 36 | | | | 65 | 17 | 20 | 38 |
| GMA | 30 | 40 | 47 | 20 | 52 | 50 | 25 | 10 | 65 | 30 |
| AIBN | 1.0 | 1.5 | 2.0 | 0.6 | 2.3 | 3.0 | 0.4 | 1.5 | 1.8 | 1.0 |
| tn-BP | | | 0.22 | | | 0.53 | | | 0.44 | |
| DPHP | 0.4 | | | 0.3 | 0.03 | 0.95 | | 0.4 | 0.03 | 0.48 | 1.73 |
| Epoxy equivalent (g/eq) | 486 | 355 | 307 | 714 | 279 | 288 | 591 | 1446 | 222 | 536 |
| Softening point (°C.) | 148 | 127 | 115 | 157 | 95 | 80 | 170 | 148 | 98 | 148 |
| Glass transition temperature (°C.) | 108 | 95 | 90 | 115 | 72 | 55 | 130 | 110 | 75 | 108 |
| Number-average molecular weight (Mn) | 6000 | 5000 | 3500 | 9600 | 2800 | 2000 | 12000 | 5000 | 4000 | 6000 |

Remarks
tn-BP: tri-n-butyl phosphate
DPHP: diphenyl hydrogenphosphite

TABLE 6

| Composition | Acrylic copolymer No. | | | | | | | | | |
|---|---|---|---|---|---|---|---|---|---|---|
| | (b-10) | (b-11) | (b-12) | (b-13) | (b-14) | (b-15) | (b-16) | (b-17) | (b-18) | (b-19) | (b-20) |
| St | 10 | 15 | | 10 | 10 | 5 | 15 | 10 | 11 | 15 | |
| MMA | | 10 | | | | | 10 | | | | |
| n-BA | | | 20 | 47 | 7 | | | | | | 20 |
| i-BMA | 45 | | | | 18 | | | | | | |
| 2-EHA | | | 32 | 25 | 16 | | 65 | | 48 | 9 | 32 | 25 |
| n-BMA | | 8 | | | | | | 15 | 32 | | 8 | |
| GMA | 35 | 45 | 55 | 27 | 65 | 30 | 60 | 10 | 80 | 45 | 55 |
| AIBN | 3.1 | 3.5 | 3.8 | 3.2 | 4.0 | 3.5 | 2.2 | 3.3 | 3.7 | 3.5 | 3.8 |
| tn-BP | 0.35 | | 0.31 | 0.13 | | 0.31 | 0.31 | | | | |
| DPHP | | 0.8 | 0.5 | 0.2 | | | 0.5 | 0.02 | 0.98 | | 1.5 |
| Epoxy equivalent (g/eq) | 414 | 323 | 263 | 542 | 218 | 485 | 240 | 1433 | 179 | 316 | 266 |
| Softening point (°C.) | 50 | 44 | 38 | 31 | 63 | 23 | 92 | 33 | 68 | 44 | 38 |
| Glass transition temperature (°C.) | 18 | 0 | −15 | −27 | 31 | −39 | 55 | −25 | 36 | 0 | −15 |
| Number-average molecular weight (Mn) | 1800 | 1500 | 1200 | 1700 | 800 | 1500 | 3000 | 1600 | 1300 | 1500 | 1200 |

TABLE 7

| | Acrylic resin (a) (parts) | Acrylic resin (b) (parts) | Weight ratio of (a)/(b) | Dodecanedioic acid (parts) | Equivalent ratio of epoxy/acid | Phosphorus compound content (%) | Difference in softening point (°C.) |
|---|---|---|---|---|---|---|---|
| Example 7 | (a-10) 637 | (b-12) 113 | 85/15 | 250 | 0.8/1 | 0.46 | 110 |
| Example 8 | (a-11) 563 | (b-11) 188 | 75/25 | 249 | 1/1 | 0.2 | 83 |
| Example 9 | (a-12) 510 | (b-10) 276 | 65/35 | 214 | 1/0.8 | 0.46 | 65 |
| Example 10 | (a-13) 751 | (b-14) 84 | 90/10 | 165 | 1/1 | 0.03 | 94 |
| Example 11 | (a-14) 551 | (b-13) 183 | 75/25 | 266 | 1/1 | 0.8 | 64 |
| Comparative Example 12 | (a-15) 616 | (b-10) 108 | 85/15 | 276 | 1/1 | 0.5 | 30 |
| Comparative Example 13 | (a-16) 598 | (b-12) 199 | 75/25 | 203 | 1/1 | 0.5 | 132 |
| Comparative Example 14 | (a-17) 758 | (b-11) 134 | 85/15 | 108 | 1/1 | 0.15 | 104 |
| Comparative Example 15 | (a-18) 436 | (b-12) 235 | 65/35 | 329 | 1/1 | 0.88 | 60 |
| Comparative Example 16 | (a-11) 502 | (b-15) 271 | 65/35 | 227 | 1/1 | 0.11 | 104 |
| Comparative Example 17 | (a-10) 580 | (b-16) 193 | 75/25 | 227 | 1/1 | 0.5 | 56 |
| Comparative Example 18 | (a-12) 576 | (b-17) 193 | 75/25 | 231 | 1/1 | 0.39 | 82 |
| Comparative Example 19 | (a-12) 600 | (b-18) 107 | 85/15 | 293 | 1/1 | 0.59 | 47 |
| Comparative Example 20 | (a-12) 727 | | 100/0 | 273 | 1/1 | 0.52 | |
| Comparative Example 21 | (a-10) 374 | (b-12) 374 | 50/50 | 252 | 1/1 | 0.61 | 110 |
| Comparative Example 22 | (a-19) 682 | (b-20) 120 | 85/15 | 198 | 1/1 | 1.7 | 110 |
| Comparative | (a-11) | (b-19) | 75/25 | 250 | 1/1 | 0 | 83 |

TABLE 7-continued

| | Acrylic resin (a) (parts) | Acrylic resin (b) (parts) | Weight ratio of (a)/(b) | Dodecanedioic acid (parts) | Equivalent ratio of epoxy/acid | Phosphorus compound content (%) | Difference in softening point (°C.) |
|---|---|---|---|---|---|---|---|
| Example 23 | 562 | 188 | | | | | |

Phosphorus compound content: total amount (weight %) of phosphoric acid ester compound and/or phosphorous acid ester compound relative to total amount of acrylic resins.

TABLE 8

| | Appearance (visual) | Gloss (60°) | Solvent resistance | Storage stability |
|---|---|---|---|---|
| Example 7 | ⊚ | 98 | ⊚ | ⊚ |
| Example 8 | ⊚ | 100 | ⊚ | ⊚ |
| Example 9 | ⊚ | 99 | ⊚ | ⊚ |
| Example 10 | ○ | 95 | ○ | ⊚ |
| Example 11 | ○ | 95 | ○ | ⊚ |
| Example 12 | ⊚ | 99 | ⊚ | ⊚ |
| Comparative Example 12 | ⊚ | 98 | ⊚ | X |
| Comparative Example 13 | X | 90 | ⊚ | ⊚ |
| Comparative Example 14 | ⊚ | 98 | X | ⊚ |
| Comparative Example 15 | X | 90 | ⊚ | ⊚ |
| Comparative Example 16 | ⊚ | 98 | ⊚ | X |
| Comparative Example 17 | X | 91 | ⊚ | ⊚ |
| Comparative Example 18 | ⊚ | 98 | X | ⊚ |
| Comparative Example 19 | X | 89 | ⊚ | ⊚ |
| Comparative Example 20 | X | 92 | ⊚ | ⊚ |
| Comparative Example 21 | ⊚ | 99 | ⊚ | X |
| Comparative Example 22 | ⊚ | 98 | ⊚ | X |
| Comparative Example 23 | ⊚ | 100 | X | ⊚ |

We claim:

1. A composition for thermosetting powder coating, which comprises
   (a) an acrylic copolymer of high softening point comprising an epoxy group-containing monomer and other monomer copolymerizable therewith and having an epoxy equivalent of 250–1,000 g/eq, a softening point of 90°–160° C. and a number-average molecular weight of 2,800 to less than 9,600,
   (b) an acrylic copolymer of low softening point comprising an epoxy group-containing monomer and other monomer copolymerizable therewith and having an epoxy equivalent of 200–600 g/eq, a softening point of 30°–70° C. and a number-average molecular weight of 500–2,000, and
   (c) a polycarboxylic acid,
and wherein the difference in softening point between the acrylic copolymer (a) of high softening point and the acrylic copolymer (b) of low softening point is 60°–120° C., the weight ratio of (a)/(b) is 95/5 to 60/40, and the equivalent ratio of [the total epoxy groups of (a) and (b)] : [the acid group of (c)] is 0.5:1 to 1:0.5.

2. A composition for thermosetting powder coating according to claim 1, wherein the difference in softening point between the acrylic copolymer (a) of high softening point and the acrylic copolymer (b) of low softening point is 64°–110° C.

3. A composition for thermosetting powder coating according to claim 1, wherein the epoxy equivalent of the acrylic copolymer (a) of high softening point is 300–500 g/eq and the epoxy equivalent of the acrylic copolymer (b) of low softening point is 200–600 g/eq.

4. A composition for thermosetting powder coating according to claim 1, wherein the number-average molecular weight of the acrylic copolymer (b) of low softening point is 800–1,800.

5. A composition for thermosetting powder coating according to claim 1, wherein the difference in glass transition temperature between the acrylic copolymer (a) of high softening point and the acrylic copolymer (b) of low softening point is 70°–125° C.

6. A composition for thermosetting powder coating according to claim 1, wherein the glass transition temperature of the acrylic copolymer (a) of high softening point is 70°–120° C. and the glass transition temperature of the acrylic copolymer (b) of low softening point is −30° to 40° C.

7. A composition for thermosetting powder coating according to claim 6, which further comprises
   (d) a phosphoric acid ester compound and/or a phosphorous acid ester compound in an amount of 0.01–1 part by weight per 100 parts by weight of the total of the acrylic copolymer (a) of high softening point and the acrylic copolymer (b) of low softening point.

8. A composition for thermosetting powder coating according to claim 1, which further comprises
   (d) a phosphoric acid ester compound and/or a phosphorous acid ester compound in an amount of 0.01–1 part by weight per 100 parts by weight of the total of the acrylic copolymer (a) of high softening point and the acrylic copolymer (b) of low softening point.

9. A composition for thermosetting powder coating according to claim 2, which further comprises
   (d) a phosphoric acid ester compound and/or a phosphorous acid ester compound in an amount of 0.01–1 part by weight per 100 parts by weight of the total of the acrylic copolymer (a) of high softening point and the acrylic copolymer (b) of low softening point.

10. A composition for thermosetting powder coating according to claim 3, which further comprises
    (d) a phosphoric acid ester compound and/or a phosphorous acid ester compound in an amount of 0.01–1 part by weight per 100 parts by weight of the total of the acrylic copolymer (a) of high softening point and the acrylic copolymer (b) of low softening point.

11. A composition for thermosetting powder coating according to claim 4, which further comprises
    (d) a phosphoric acid ester compound and/or a phosphorous acid ester compound in an amount of 0.01–1 part by weight per 100 parts by weight of the total of the acrylic copolymer (a) of high softening point and the acrylic copolymer (b) of low softening point.

12. A composition for thermosetting powder coating according to claim 5, which further comprises
    (d) a phosphoric acid ester compound and/or a phosphorous acid ester compound in an amount of 0.01–1 part by weight per 100 parts by weight of the total of the acrylic copolymer (a) of high softening point and the acrylic copolymer (b) of low softening point.

* * * * *